United States Patent
Zhang et al.

(10) Patent No.: US 9,531,818 B2
(45) Date of Patent: Dec. 27, 2016

(54) INFORMATION NOTIFICATION METHODS, APPARATUSES AND ELECTRONIC DEVICES

(75) Inventors: Bo Zhang, Beijing (CN); Chunlei Zhao, Beijing (CN)

(73) Assignees: LENOVO (BEIJING) LIMITED, Beijing (CN); BEIJING LENOVO SOFTWARE LTD., Beijing (CN)

( * ) Notice: Subject to any disclaimer, the term of this patent is extended or adjusted under 35 U.S.C. 154(b) by 408 days.

(21) Appl. No.: 14/002,680

(22) PCT Filed: Feb. 23, 2012

(86) PCT No.: PCT/CN2012/071514
§ 371 (c)(1),
(2), (4) Date: Aug. 30, 2013

(87) PCT Pub. No.: WO2012/116613
PCT Pub. Date: Sep. 7, 2012

(65) Prior Publication Data
US 2013/0339513 A1    Dec. 19, 2013

(30) Foreign Application Priority Data

Mar. 1, 2011  (CN) .......................... 2011 1 0048838
Mar. 1, 2011  (CN) .......................... 2011 1 0049486

(51) Int. Cl.
H04L 29/08       (2006.01)
H04M 1/725      (2006.01)
H04L 29/06       (2006.01)

(52) U.S. Cl.
CPC .............. *H04L 67/16* (2013.01); *H04L 69/18* (2013.01); *H04M 1/72519* (2013.01)

(58) Field of Classification Search
CPC .................... H04M 2201/10; H04M 2201/36; H04M 2203/6009; H04M 3/4931; H04M 3/5237; H04M 3/567; H04L 67/2842; H04L 69/28; H04L 67/288; H04L 67/10; H04L 67/16; H04L 63/20; H04L 41/0893; H04L 41/50; H04L 41/5041; H04L 67/1097; H04L 41/00; H04L 41/5096; H04L 69/18
(Continued)

(56) References Cited

U.S. PATENT DOCUMENTS 5,818,836 A  * 10/1998  DuVal .......................... 370/389
5,828,730 A  * 10/1998  Zebryk et al. ............ 379/88.27
(Continued)

FOREIGN PATENT DOCUMENTS

CN      101547256 A    9/2009
CN      101656794 A    2/2010
(Continued)

OTHER PUBLICATIONS

International Search Report, International Application No. PCT/CN2012/071514.

*Primary Examiner* — David Lazaro
*Assistant Examiner* — Berhanu Shitayewoldetsadi
(74) *Attorney, Agent, or Firm* — Kinney & Lange, P.A.

(57) ABSTRACT

There is disclosed an information notification method, apparatus and first electronic device. The information notification method is used in a first electronic device having first user identification, comprising the steps of transmitting a request to talk with a second electronic device via a first application module; determining whether it receives voice data collected from the second electronic device during a communication process when the communication process ends, and obtaining a determination result; and automatically switching to a second application module for transmitting a notification if the determination result indicates that no voice data has been
(Continued)

received during the communication process. According to the embodiments of the present disclosure, it automatically switches to a second application module if the called party does not answer a call, so that the user may transmit a notification by using the second application module, to inform the called party of the thing, which is convenient to the user.

12 Claims, 6 Drawing Sheets

(58) Field of Classification Search
USPC ....... 709/223, 224, 225, 232, 229, 245, 239; 455/259, 466, 100.01; 703/223
See application file for complete search history.

(56) References Cited

U.S. PATENT DOCUMENTS

| | | | |
|---|---|---|---|
| 6,359,974 B1* | 3/2002 | Ishibashi | 379/100.06 |
| 6,792,082 B1* | 9/2004 | Levine | 379/67.1 |
| 6,987,841 B1* | 1/2006 | Byers | H04M 3/42221 379/68 |
| 7,421,470 B2* | 9/2008 | Ludwig et al. | 709/204 |
| 7,747,797 B2* | 6/2010 | Abraham et al. | 710/62 |
| 8,068,011 B1* | 11/2011 | Sajadi et al. | 340/10.4 |
| 8,099,045 B2* | 1/2012 | Chang | 455/41.1 |
| 8,224,246 B2* | 7/2012 | Suumaki et al. | 455/41.1 |
| 8,396,514 B2* | 3/2013 | Adams | 455/566 |
| 8,472,931 B2* | 6/2013 | Reding et al. | 455/417 |
| 8,594,634 B2* | 11/2013 | Aberethy et al. | 455/412.1 |
| 8,718,262 B2* | 5/2014 | Conway et al. | 379/265.01 |
| 8,725,626 B2* | 5/2014 | Nystrom et al. | 705/38 |
| 2002/0178000 A1* | 11/2002 | Aktas | H04L 12/5835 704/235 |
| 2003/0091322 A1* | 5/2003 | Van Der Schaar | G11B 27/002 386/201 |
| 2003/0126436 A1* | 7/2003 | Greenberg et al. | 713/168 |
| 2004/0029567 A1* | 2/2004 | Timmins et al. | 455/412.1 |
| 2005/0021863 A1* | 1/2005 | Jungck | 709/246 |
| 2006/0031523 A1* | 2/2006 | Morris | H04L 51/36 709/227 |
| 2006/0135064 A1* | 6/2006 | Cho et al. | 455/41.1 |
| 2006/0195695 A1* | 8/2006 | Keys | H04L 9/12 713/169 |
| 2006/0288107 A1* | 12/2006 | Klassen et al. | 709/227 |
| 2007/0103377 A1* | 5/2007 | Abramov et al. | 343/818 |
| 2007/0249371 A1* | 10/2007 | Son | 455/466 |
| 2007/0277216 A1* | 11/2007 | Nakajima | 725/133 |
| 2008/0072263 A1* | 3/2008 | Kim | 725/62 |
| 2008/0250142 A1* | 10/2008 | Magnusson et al. | 709/225 |
| 2009/0006159 A1* | 1/2009 | Mohr | G06Q 10/00 705/7.13 |
| 2009/0113560 A1* | 4/2009 | Kori et al. | 726/29 |
| 2009/0138426 A1* | 5/2009 | Ishikawa | 707/1 |
| 2009/0170431 A1* | 7/2009 | Pering et al. | 455/41.1 |
| 2009/0203399 A1* | 8/2009 | Rofougaran | 455/556.1 |
| 2010/0058463 A1* | 3/2010 | Bertin | 726/17 |
| 2011/0207484 A1* | 8/2011 | Karnam Holal | H04L 51/16 455/466 |
| 2011/0270685 A1* | 11/2011 | Marks et al. | 705/14.66 |
| 2011/0273575 A1* | 11/2011 | Lee | 348/222.1 |
| 2011/0287716 A1* | 11/2011 | Lortz | 455/41.1 |

FOREIGN PATENT DOCUMENTS

| | | |
|---|---|---|
| CN | 101924810 A | 12/2010 |
| CN | 101924814 A | 12/2010 |
| CN | 102214188 A | 10/2011 |
| WO | WO 2013097038 A1 * | 7/2013 |

* cited by examiner

US 9,531,818 B2

INFORMATION NOTIFICATION METHODS, APPARATUSES AND ELECTRONIC DEVICES

CROSS-REFERENCE TO RELATED APPLICATION(S)

This application is a Section 371 National Stage Application of International Application No. PCT/CN2012/071514, filed Feb. 23, 2012, which claims priority to CN 201110049486.4 filed on Mar. 1, 2011 and CN201110048838.4 filed on Mar. 1, 2011, the entire contents of which are incorporated herein by reference in their entirety.

TECHNICAL FIELD

The embodiments of the present application relates to the field of communication technique, and more particularly, to information notification methods, apparatuses and electronic devices.

BACKGROUND

Thanks to the development of electronic technique, the current electronic device is capable of processing more and more tasks. For example, a mobile phone can communicate emails with an email client installed thereon, in addition to voice communication which is based on wireless communication systems. Such a mobile phone can also conduct instant communication by means of an instant messaging communication client which has been installed thereon.

If a user makes a call by using an electronic device while the called party does not answer the call, the user may communicate with the party or inform the party of the things in other ways. If the party does not answer the call, then the user usually sends a short message to the party to tell the things.

However, the existing electronic device has at least the following disadvantages.

A user needs to re-start a new application (e.g., a short message application) after he/she hang up, which is inconvenient to the user.

Furthermore, the communications made by one person via different communication manners have corresponding communication records in the electronic device. For example, a sent short message has a read record in the electronic device. An answered call has a received call record. A missed call has a missed call record.

A sent message has an unread short message record before it has been read. An unread email has an unread email record. However, there is no mechanism for outputting all the records of one person simultaneously, and thus it is inconvenient for a user to view the different records. An example is given below.

It is assumed that user B sends to user A a short message to inquiry the price of a series of products. User A sends a short message back to user B, informing user B that he/she had tell user B the things in a previous email. User B may not know information about the email, such as the sending date, and needs to search in the email client of the electric device before he knows the price. Therefore, it causes inconvenience to a user in using the electronic device.

In the case where the user sends a short message if the called party does not answer the call, the called party may know that the short message is related to the missed call only if he/she has read the short message, which also causes inconvenience to a user.

SUMMARY

An object of embodiments of the present disclosure is to provide information notification methods, apparatuses and electronic devices that can improve the convenience of using an electronic device.

According to an embodiment of the present disclosure, there is provided an information notification method for an electronic device having first user identification, including the steps of:

transmitting a request to talk with a second electronic device via a first application module;

determining whether it receives voice data collected from the second electronic device during a communication process when the communication process ends, and obtaining a determination result; and automatically switching to a second application module for transmitting a notification if the determination result indicates that no voice data has been received during the communication process.

In the information notification method, the notification includes information inputted via an input interface of the second application module or information that is inputted and stored beforehand.

The information notification method further includes:

automatically setting user identification of a receiving party of the notification in the second application module after it automatically switches to the second application module for transmitting the notification, In the information notification method, the second electronic device has second user identification. The step of automatically setting user identification of a receiving party of the notification in the second application module after it automatically switches to the second application module for transmitting the notification further includes:

determining the communication manner of the second application module;

selecting the second user identification or third user identification associated with the second user identification based on the communication manner; and setting the selected user identification as the user identification of the receiving party of the notification in the second application module.

In the information notification method, the step of automatically switching to a second application module for transmitting a notification if the determination result indicates that no voice data has been received during the communication process further includes:

determining whether the second application module has been turned on; and switching to the second application module if the second application module has been turned on; otherwise, turning on the second application module.

According to an embodiment of the present disclosure, there is further provided an information notification apparatus for an electronic device having first user identification, including a transmission module configured to transmit a request to talk with a second electronic device via a first application module;

a determination module configured to determine whether it receives voice data collected from the second electronic device during a communication process when the communication process ends, and obtain a determination result; and a switch module configured to automatically switch the first electronic device to a second application module for transmitting a notification if the determination result indicates that no voice data has been received during the communication process.

In the information notification apparatus, the notification includes information inputted via an input interface of the second application module or information that is inputted and stored beforehand.

The information notification apparatus further includes:

a setting module configured to automatically set user identification of a receiving party of the notification in the second application module after the switch module automatically switches the first electronic device to the second application module for transmitting the notification.

In the information notification apparatus, the second electronic device has second user identification. The setting module further includes:

a communication manner determination unit configured to determine the communication manner of the second application module;

a user identification selection unit configured to select the second user identification or third user identification associated with the second user identification based on the communication manner; and a setting unit configured to set the selected user identification as the user identification of the receiving party of the notification in the second application module.

In the information notification apparatus, the switch module further includes:

a turn-on determination unit configured to determine whether the second application module has been turned on; and a switching unit configured to switch to the second application module if the second application module has been turned on, and otherwise turn on the second application module, According to an embodiment of the present disclosure, there is still further provided a first electronic device having first user identification. The first electronic device includes a processor which is caused to: transmit a request to talk with a second electronic device via a first application module; determine whether it receives voice data collected from the second electronic device during a communication process when the communication process ends, and obtain a determination result; and automatically switch the first electronic device to a second application module for transmitting a notification if the determination result indicates that no voice data has been received during the communication process.

In the first electronic device, the processor further includes:

a transmission module configured to transmit a request to talk with a second electronic device via a first application module;

a determination module configured to determine whether it receives voice data collected from the second electronic device during a communication process when the communication process ends, and obtain a determination result; and a switch module configured to automatically switch the first electronic device to a second application module for transmitting a notification if the determination result indicates that no voice data has been received during the communication process.

The embodiments of the present disclosure have the following advantages.

In the information notification method, apparatus and first electronic device according to the embodiments of the present disclosure, it automatically switches to a second application module if the called party does not answer the call during the calling process, and thus the user may send a message via the second application module to inform the called party of the things, which brings convenience to the user.

In the information notification method, apparatus and first electronic device according to the embodiments of the present disclosure, the first electronic device sets automatically user identification of a receiving party of the notification in the second application module after it switches to the second application module, and thus the user does not need to manually enter user identification of the receiving party, which simplifies the user operation and brings convenience to the user.

According to an embodiment of the present disclosure, there is yet further provided an information notification method for an electronic device which supports at least two communication manners, the information notification method includes the steps of:

determining first user identification recorded in a first communication record, the first communication record corresponding to a first communication manner;

determining a second communication record corresponding to third user identification, the second communication record corresponding to a second communication manner that is different from the first communication manner, the third user identification being the same or associated with the first user identification; and establishing a correlation between the first communication record and the second communication record so that the first and second communication records are outputted simultaneously.

The information notification method further includes:

outputting the first and second communication records simultaneously.

In the information notification method, the first and second communication records are communication recorded labeled as unread. The method has the following advantages. Data integrating all data from one person is too large to view, and thus it is preferable to integrate only unread messages and missed calls, so as to reduce the number of viewing operations. It is further preferable to display the time relationship of the un-processed information after integration, so that it is easier for the user to determine the relationship of the integrated information, In the information notification method, when the first and second communication records each have corresponding communication content data, the step of outputting the first and second communication records simultaneously further includes outputting the communication content data of the first and second communication records simultaneously.

In the information notification method, the time when the second communication record is recorded is later than that the first communication record is recorded.

The information notification method further includes:

determining fourth user identification corresponding to a new, third communication record when the third communication record appears, and establishing a correlation between the first communication record and the third communication record when the fourth user identification is the same or associated with the first user identification, so that the first and second communication records are outputted simultaneously.

The information notification method further includes: determining whether there is a new communication record generated, setting the newly generated communication record as the first communication record if the new communication record is generated.

In the information notification method, the time interval between the time when the second communication record is recorded and the time when the first communication record is recorded is less than a predetermined time length.

In the information notification method, the first communication record is a communication record of a missed call, and the second communication record is the notification sent by the caller of the missed call or an associated user of the caller after the call by a manner rather than making a call.

In order to achieve the object, according to an embodiment of the present disclosure, there is further provided an information notification apparatus for an electronic device which supports at least two communication manners, the information notification apparatus includes:
a first identification determination module configured to determine first user identification recorded in a first communication record, the first communication record corresponding to a first communication manner;
a communication record determination module configured to determine a second communication record corresponding to third user identification, the second communication record corresponding to a second communication manner that is different from the first communication manner, the third user identification being the same or associated with the first user identification; and
a first correlation establishment module configured to establish a correlation between the first communication record and the second communication record so that the first and second communication records are outputted simultaneously.

The information notification apparatus further includes:
an output module configured to output the first and second communication records simultaneously.

In the information notification apparatus, the first and second communication records are communication records labeled as unread.

In the information notification apparatus, when the first and second communication records each have corresponding communication content data, the output module is configured to output the communication content data of the first and second communication records simultaneously.

In the information notification apparatus, the time when the second communication record is recorded is later than that the first communication record is recorded.

The information notification apparatus further includes:
a second identification determination module configured to determine fourth user identification corresponding to a new, third communication record when the third communication record appears, and
a second correlation establishment module configured to establish a correlation between the first communication record and the third communication record when the fourth user identification is the same or associated with the first user identification, so that the first and second communication records are outputted simultaneously.

The information notification apparatus further includes:
a determination module configured to determine whether there is generated a new communication record,
a setting module configured to set a newly generated communication record as the first communication record if the new communication record is generated.

In the information notification apparatus, the time interval between the time when the second communication record is recorded and the time when the first communication record is recorded is less than a predetermined time length.

In the information notification apparatus, the first communication record is a missed call record, and the second communication record is the notification sent by the caller of the missed call or an associated user of the caller after the call by a manner rather than making a call.

In order to achieve the object, according to an embodiment of the present disclosure, there is further provided an electronic device, including:
a communication module configured to support at least two communication manners,
a storage module configured to store communication records and user identification,
an output unit, and
a processor configured to determine first user identification recorded in a first communication record of the communication records, determine a second communication record of the communication records corresponding to third user identification, and establish a correlation between the first communication record and the second communication record so that the output unit outputs the first and second communication records simultaneously, the first communication record corresponding to a first communication manner, the third user identification being the same or associated with the first user identification, the second communication record corresponding to a second communication manner that is different from the first communication manner.

In the electronic device, the processor further includes:
a first identification determination module configured to determine first user identification recorded in a first communication record, the first communication record corresponding to a first communication manner;
a communication record determination module configured to determine a second communication record corresponding to third user identification, the second communication record corresponding to a second communication manner that is different from the first communication manner, the third user identification being the same or associated with the first user identification; and
a first correlation establishment module configured to establish a correlation between the first communication record and the second communication record so that the first and second communication records are outputted simultaneously.

In the information notification method, apparatus and electronic device according to the embodiments of the present disclosure, communication records of different communication manners of one person are correlated and can be outputted simultaneously, so that a user can easily view records of different communication manners of one person.

In the information notification method, apparatus and electronic device according to the embodiments of the present disclosure, outputting the first and second communication records further includes outputting communication content data of the first and second communication records. A user does not need to turn to a corresponding application in order to read content of the communication records, which brings convenience to the user.

BRIEF DESCRIPTION OF THE DRAWINGS

Hereunder drawings used in the embodiments of the present disclosure and prior art will be described to clearly explain the embodiments of the present disclosure or prior art. Obviously, the following drawings are only some embodiments of the present disclosure. For one skilled in the art, other drawing will be obtained according to these drawings without inventive effort.

DETAILED DESCRIPTION OF THE EMBODIMENTS

The solutions of embodiments of the present disclosure will be clearly and completely described from the following detailed description taken conjunction with the drawings. Obviously, the described embodiments are only a portion of embodiments of the present disclosure, rather than all embodiments, Based on embodiments in the present disclosure, every other embodiment obtained by one skilled in the art without inventive labors belongs to the protection scope of the present disclosure.

In the information notification method, apparatus and first electronic device according to embodiments of the present disclosure, it automatically switches to a second application module if the called party does not answer the call during the calling process, and thus the user may send a message via the second application module to inform the called party of the things, which brings convenience to the user.

Figure 1:
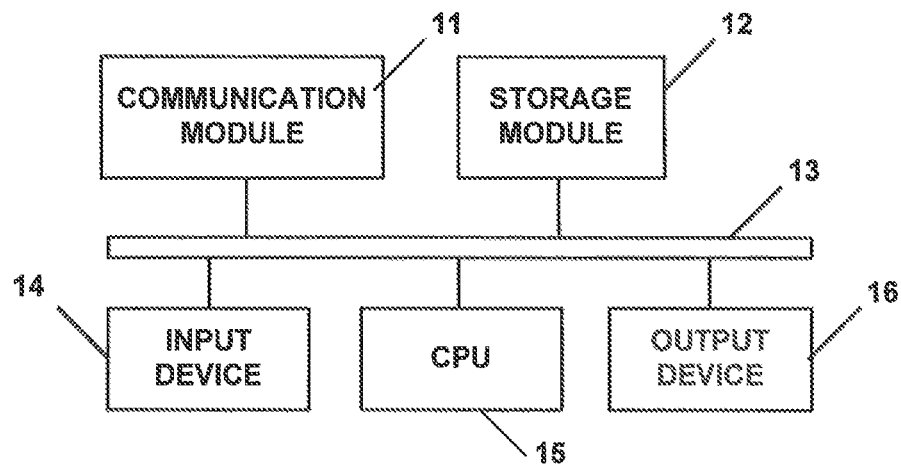
FIG. 1 is a schematic block diagram showing an electronic device according to an embodiment of the present disclosure.

As shown in FIG. 1, an electronic device according to an embodiment of the present disclosure includes communication module 11, storage module 12, bus 13, input device 14, CPU 15, output device 16, etc.

The communication module 11 is configured for communication, and supports at least two communication manners. For example, the communication module 11 may be a module for wired communication, such as a wired network card, or a module for wireless communication, such as a wireless network card, or an existing radio frequency transmitter including antennas in a wireless communication terminal. A device capable of communication necessarily has at least one communication module, The communication module according to the embodiment of the present disclosure is similar to the present communication module, and is not described in details herein, The storage module 12 is configured for various data and programs, such as communication records and user identifications. For example, the storage module 12 stores the communication records and the correlation between user identifications. The storage module may be embodied as internal memory cards, hard disks, or external, such as an external memory device (e.g., USB disk, flash disk, etc,) that connects to the mainboard of the electronic device via a USB interface.

The input device 14 is for example a part for a user to input data or commands, such as a keyboard and a mouse.

The output device 16 is for example a display. It can be embodied as a LCD screen of the electronic device. With regard to different outputting manners, the output device may be a voice output device of the electronic device, such as an audio adapter and a speaker. In some cases, the output may be implemented as vibrations of a vibration motor. The foregoing is just some of the examples.

Figure 2:
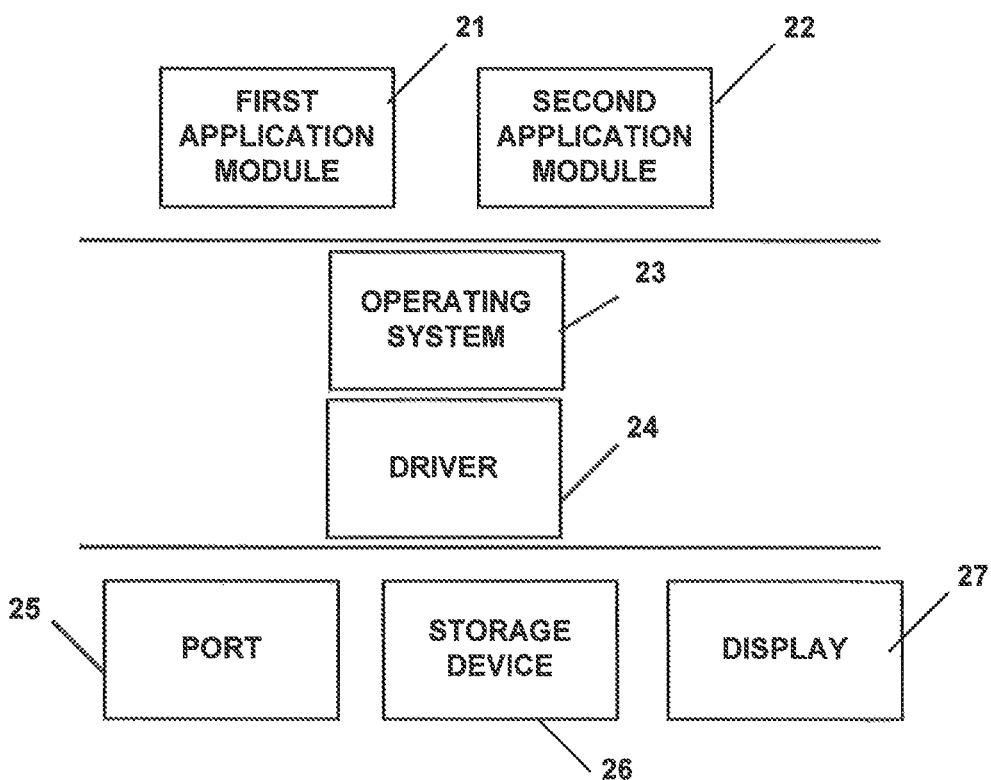
FIG. 2 is a schematic diagram showing an electronic device according to an embodiment of the present disclosure.

FIG. 2 is a schematic diagram showing an electronic device according to an embodiment of the present disclosure. As shown in FIG. 2, the electronic device has an operating system and drivers installed therein, such as drivers 24 for ports 25, storage 26 and display 27. The operating system executes applications thereon, for example first application module 21 and second application module 22.

Figure 3:
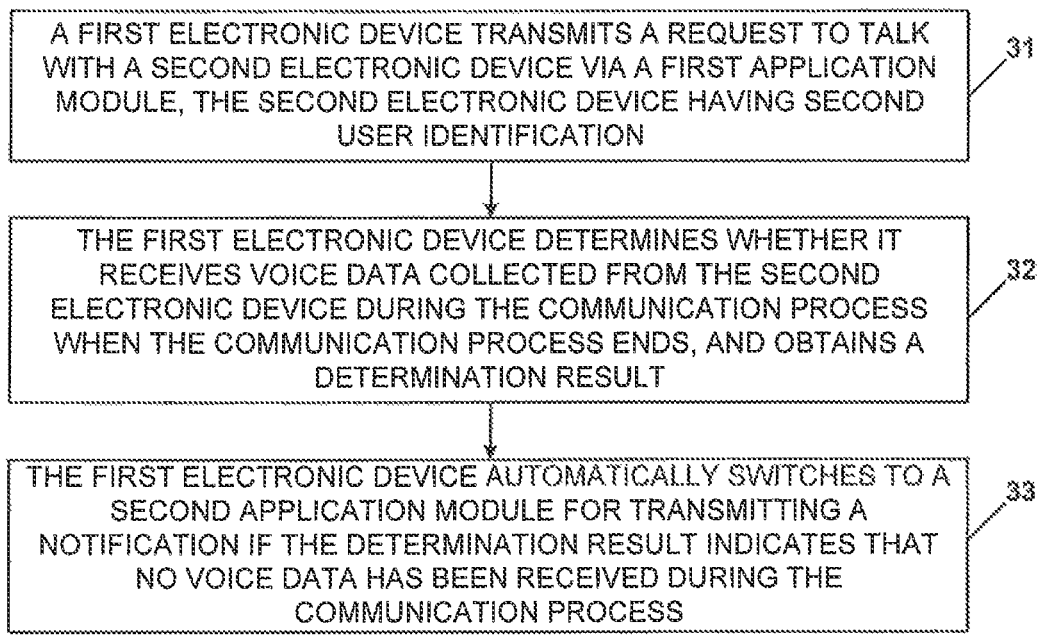
FIG. 3 is a schematic flowchart of an information notification method according to an embodiment of the present disclosure.

As shown in FIG. 3, an information notification method according to an embodiment of the present disclosure is used for a first electronic device having first user identification. The information notification method includes the following steps.

At step 31, a first electronic device transmits a request to talk with a second electronic device via a first application module 21, the second electronic device having second user identification.

At step 32, the first electronic device determines whether it receives voice data collected from the second electronic device during the communication process when the communication process ends, and obtains a determination result.

At step 33, the first electronic device automatically switches to a second application module 22 for transmitting a notification if the determination result indicates that no voice data has been received during the communication process.

In an embodiment of the present disclosure, the talk may be a voice communication, or a video communication. An electronic device that is capable of communication necessarily has a software module for turning on the communication, The first application module 21 is thus not described in details herein.

If the called party does not hear the ringtone, the calling party cannot deliver information to the called party in such case. In the embodiment of the present disclosure, it is determined whether the called party answers the call by determining whether it receives voice data collected from the second electronic device during the communication process.

There are the following cases where the calling party cannot talk with the called party in a voice communication process.
1. The called party neither answers the call, nor sets auto call answer, ringtone playing and other setting.
2. The called party presses the ENDCALL key to end the calling process during the ringing process.
3. The called party does not answer the call, but sets automatic reply setting.

The calling party cannot talks with the called party in any of the foregoing cases (there are certainly other cases that are not listed herein). From the perspective of technique, the calling electronic device has not received voice data collected from the called electronic device during the communication process (even if the called party sends voice data back in the automatic reply, ringtone play and other cases, the voice data is, however, stored in advance, but not collected in real time during the communication process). If the calling electronic device does not receive voice data collected from the called electronic device during the communication process, it determines that the calling party cannot deliver information via a voice communication, and other communication manners are needed to deliver the information. In such case, the information notification method according to the embodiment of the present disclosure automatically switches to a second application module 22 for transmitting a notification, so that the user may transmit information via the second application module 22, inform the called party timely.

The information to be delivered each time the user makes a call is different. Accordingly, in the embodiment of the present disclosure, the information to be communicated by the user is the information inputted via an input interface of the second application module 22. The information inputted by the user in real time can relatively accurately express the intention of the user.

The information, however, may be information that is inputted and stored beforehand in other cases. Examples are given below.

It is assumed that several pieces of information are stored beforehand, and the content read as:
I'm sorry that I will get there a bit late!
Be noticed that the meeting is cancelled!
See you at the usual place.
. . .
When the user wants to have a date with an old friend at a usual place, the third piece of information may be transmitted. When the user calls to inform that a meeting is cancelled but the called party does not answer the call, the second piece of information may be transmitted.

Therefore, the information to be communicated by the user may be the information inputted via an input interface of the second application module 22 or the information that is inputted and stored beforehand.

In the process, according to the method of the embodiment of the present disclosure, the calling electronic device automatically switches to a second application module 22 for transmitting a notification when the called party does not answer the call, so that the user can easily and conveniently transmit information to the called party. The method reduces the time for the user to search for the second application module 22, and brings convenience to the user.

In the embodiment of the present application, the first application module 21 and the second application module 22 may be different application programs. For example, the first application module 21 may be a voice calling application module, while the second application module 22 may be a short messaging application, MSN client, email client, multimedia message transmitting module, etc. The first application module 21 and the second application module 22 may also be integrated into a software module. For instance, many communication software modules are capable of not only voice transmission, but also text transmission. In such case, switching to the second application module 22 is substantially turn-on of one functional module of the application module.

In the embodiment of the present application, turning on the second application module 22 includes several cases as follows.
1. It is a single-process electronic device, and the first application module 21 and the second application module 22 belong to different applications.

With regard to such electronic device, only one process is allowed. Accordingly, the first application module 21 and the second application module 22 could not been turned on at the same time, In such case, the operation that the first electronic device automatically switches to the second application module 22 for transmitting a notification is to turn off the first application module 21 and turn on the second application module 22.

2. It is a single-process electronic device, and the first application module 21 and the second application module 22 belong to the same application.

With regard to such electronic device, only one process is allowed. The first application module 21 and the second application module 22 belong to one application, and thus the operation that the first electronic device automatically switches to the second application module 22 for transmitting a notification is to determine whether the second application module 22 has been turned on. When the second application module 22 has been turned on, it switches to the second application module 22; otherwise, it turns on the second application module 22.

3. It is a multi-process electronic device, and the first application module 21 and the second application module 22 belong to different applications.

With regard to such electronic device, a plurality of processes is allowed. Although the first application module 21 and the second application module belong to different applications, these two applications may run at the same time. In such case, the operation that the first electronic device automatically switches to the second application module 22 for transmitting a notification is to determine whether the second application module 22 has been turned on. When the second application module 22 has been turned on, it switches to the second application module 22; otherwise, it turns on the second application module 22.

4. It is a multi-process electronic device, and the first application module 21 and the second application module 22 belong to the same application.

With regard to such electronic device, a plurality of processes are allowed. Although the first application module 21 and the second application module 22 belong to one application, the second application module 22 may or may not be turned on. In such case, the operation that the first electronic device automatically switches to the second application module 22 for transmitting a notification is to determine whether the second application module 22 has been turned on. When the second application module 22 has been turned on, it switches to the second application module 22; otherwise, it turns on the second application module 22.

In summary, in the second, third and fourth cases, automatically switching to the second application module 22 for transmitting a notification if the determination result indicates that no voice data has been received during the communication process further includes:

determining whether the second application module 22 has been turned on; and switching to the second application module 22 if the second application module 22 has been turned on; otherwise, turning on the second application module 22.

In the embodiment of the present disclosure, the user may transmit the notification after it switches to the second application module 22. However, for any communication manner, the transmission may be performed correctly only if the receiving party information is known. It is obvious that the information may be inputted by the user. When taking the contact list of the electronic device into account, all the communication manners of a user are recorded in one item. For example, one item of the contact list includes not only the mobile phone number, but also email address, QQ number, MSN number, etc. In order to further save time for the user and facilitate the operation, the information notification method according to the embodiment of the present disclosure further includes:

automatically setting user identification of a receiving party of the notification in the second application module 22 after the first electronic device automatically switches to the second application module for transmitting the notification.

As described above, for different communication manners, user identifications of the receiving party are different. Accordingly, the appropriate user identification is selected based on the communication manner of the second application module 22. Automatically setting user identification of a receiving party of the notification in the second application module 22 after the first electronic device automatically switches to the second application module for transmitting the notification further includes:

determining the communication manner of the second application module 22;

selecting the second user identification or third user identification associated with the second user identification based on the communication manner; and setting the selected user identification as the user identification of the receiving party of the notification in the second application module 22.

An example is given below.

It is assumed that information about user A in the contact list is;

Name: AAA

Mobile phone number: 13333333333

QQ number: 22222222

MSN number: AAA@hotmail.com.

Herein, take the case where the second application module 22 is a short message transmission module as an example. When it is determined that the second application module 22 is a short message transmission module, it is determined that user identification corresponding to the communication manner is a mobile phone number. In such case, the phone number 13333333333 is used as the user identification of the receiving party, If the second application module 22 is a QQ client, the QQ number 22222222 is selected as the user identification of the receiving party.

The transmission is performed to transmit a notification to the counterpart once the user identification of the receiving party has been determined, so that the called user knows the things that the calling user wants to tell in the missed call.

Figure 4:
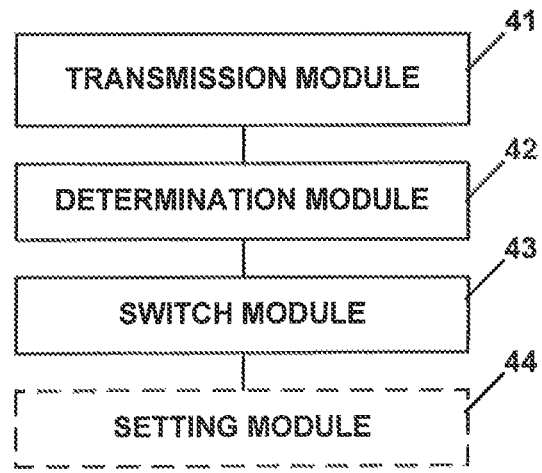
FIG. 4 is a schematic block diagram showing an information notification apparatus according to an embodiment of the present disclosure.
Figure 5:
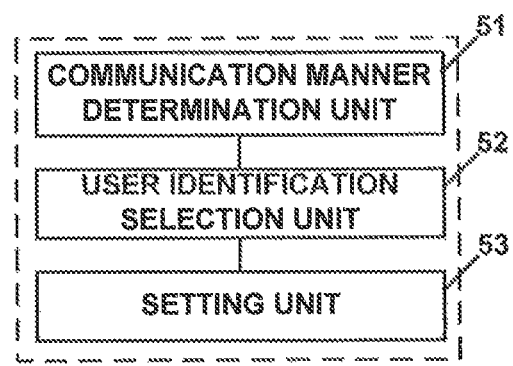
FIG. 5 is a schematic block diagram of a setting module in an information notification apparatus according to an embodiment of the present disclosure.

An information notification for a first electronic device having first user identification according to an embodiment of the present disclosure is shown in FIG. 4. The information notification apparatus includes;

a transmission module 41 configured to transmit a request to talk with a second electronic device 22 via a first application module 21;

a determination module 42 configured to determine whether it receives voice data collected from the second electronic device during a communication process when the communication process ends, and obtain a determination result; and a switch module 43 configured to automatically switch the first electronic device to a second application module 22 for transmitting a notification if the determination result indicates that no voice data has been received during the communication process.

In the information notification apparatus, the notification includes information inputted via an input interface of the second application module or information that is inputted and stored beforehand.

The information notification apparatus further includes:

a setting module 44 configured to automatically set user identification of a receiving party of the notification in the second application module 22 after the switch module 43 automatically switches the first electronic device to the second application module 22 for transmitting the notification.

Figure 6:
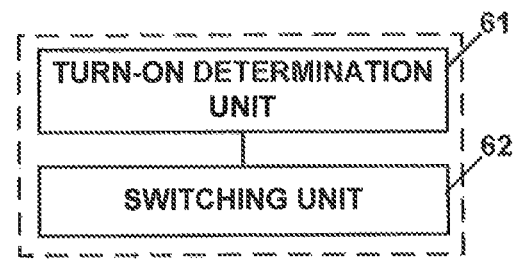
FIG. 6 is a schematic block diagram of a switch module in an information notification apparatus according to an embodiment of the present disclosure.

In the information notification apparatus, the second electronic device has second user identification. As shown in FIG. 6, the setting module further includes:

a communication manner determination unit 51 configured to determine the communication manner of the second application module;

a user identification selection unit 52 configured to select the second user identification or third user identification associated with the second user identification based on the communication manner; and a setting unit 53 configured to set the selected user identification as the user identification of the receiving party of the notification in the second application module, As shown in FIG. 6, in the information notification apparatus, the switch module 43 further includes:

a turn-on determination unit 61 configured to determine whether the second application module has been turned on; and a switching unit 62 configured to switch to the second application module if the second application module has been turned on, and otherwise turn on the second application module.

The first electronic device according to an embodiment of the present disclosure has first user identification. The first electronic device includes a processor 15 which is caused to: transmit a request to talk with a second electronic device via a first application module 21; determine whether it receives voice data collected from the second electronic device during a communication process when the communication process ends, and obtain a determination result; and automatically switch the first electronic device to a second application module 22 for transmitting a notification if the determination result indicates that no voice data has been received during the communication process.

In particular, the processor 15 includes:
a transmission module 41 configured to transmit a request to talk with a second electronic device via a first application module 21;
a determination module 42 configured to determine whether it receives voice data collected from the second electronic device during a communication process when the communication process ends, and obtain a determination result; and
a switch module 43 configured to automatically switch the first electronic device to a second application module 22 for transmitting a notification if the determination result indicates that no voice data has been received during the communication process.

The processor 15 further includes:
a setting module 44 configured to automatically set user identification of a receiving party of the notification in the second application module 22 after the switch module 43 automatically switches the first electronic device to the second application module 22 for transmitting the notification.

The second electronic device has second user identification. The setting module 44 further includes:
a communication manner determination unit 51 configured to determine the communication manner of the second application module;
a user identification selection unit 52 configured to select the second user identification or third user identification associated with the second user identification based on the communication manner; and
a setting unit 53 configured to set the selected user identification as the user identification of the receiving party of the notification in the second application module 22.

The switch module 43 further includes:
a turn-on determination unit 61 configured to determine whether the second application module 22 has been turned on; and
a switching unit 62 configured to switch to the second application module 22 if the second application module 22 has been turned on, and otherwise turn on the second application module 22.

Other embodiments of the present disclosure relate to an information notification method, apparatus and electronic device. Communication records of different communication manners of one person are correlated and can be outputted simultaneously, so that a user can easily view records of different communication manners of one person.

Figure 7:
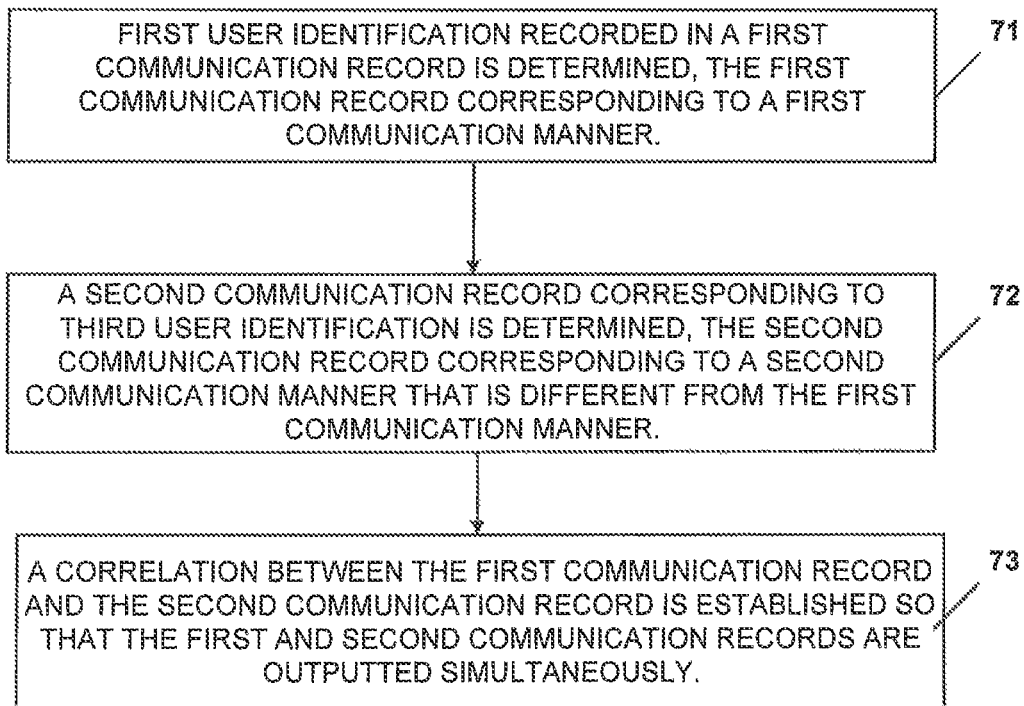
FIG. 7 is a schematic flowchart of an information notification method according to an embodiment of the present disclosure.

An information notification method for an electronic device which supports at least two communication manners according to an embodiment of the present disclosure is shown in FIG. 7. The information notification method includes the following steps.

At step 71, first user identification recorded in a first communication record is determined, the first communication record corresponding to a first communication manner.

At step 72, a second communication record corresponding to third user identification is determined, the second communication record corresponding to a second communication manner that is different from the first communication manner, the third user identification being the same or associated with the first user identification.

At step 73, a correlation between the first communication record and the second communication record is established so that the first and second communication records are outputted simultaneously.

A present mobile phone supports at least two communication manners, i.e., the voice communication and the short message communication. As the development of the processor technique, the present mobile phone can support more and more communication manners, such as Email communication, Instant messaging communication, multimedia communication, etc.

It should be understood that the term "different communication manners" referred to in the embodiment of the present disclosure does not mean the wired-network based communication and wireless-network based communication. It refers to communications performed by different applications. Even if both communications utilize a fixed network or a wireless network, the communication manner of a communication performed by a short-message based application and the communication manner of a communication performed by an Email based application belong to different communication manners. Even the communication manners of communications performed by different modules of one application are different communication manners. For example, instant messaging software is capable of not only voice communication, but also text communication. In such case, the communications manners of respective communications are considered as being different.

In the case that the electronic device supports a plurality of communication manners, the communications performed by different communication manners for one person have corresponding communication records in the electronic device in the embodiment of the present disclosure. Take ZHANG San as an example. It is assumed that he has conducted communications with L1 Si, including:
a voice call of 3 minutes at time t1;
a short message transmitted at time t2;
an email transmitted at time t3;
. . .
wherein it is assumed that L1 Si did not view the short message transmitted at time t2 and the email transmitted at time t3. The electronic device of L1Si has the following communication records:
communication record A1, a communication record of the voice call, possibly including the mobile phone number of ZHANG San (for example, 13800000000), the conversation time length, etc,
communication record A2, a communication record of the short message, possibly including the mobile phone number of ZHANG San (for example, 13800000000), the time when the short message was transmitted, etc.
communication record A3, a communication record of the email, possibly including the email address of ZHANG San (for example, zhangsan@AAA.com), the time when the email was transmitted, etc.

By using the method according to the embodiment of the present disclosure, the communication manner of communication record A1 is a mobile voice communication. Accordingly, the first user identification recorded in the communication record of the voice call is determined, i.e., the mobile phone number 13800000000, All the contact manners of the same person are recorded in the contact list of the present electronic device. Take ZHANG San as an example. In the contact list of L1 Si, there is an item of ZHANG San, where the mobile phone number, email address, QQ number, MSN number, etc. are recorded.

Now a communication record from ZHANG San whose communication manner is different from the mobile voice communication is searched for, Based on the mobile phone number of ZHANG San, other user identifications of ZHANG San can be obtained, such as the email address. Communication records A2 and A2 can be found according to the mobile phone number and email address of ZHANG San. Communication records A2 and A2 are different from communication A1 with respect to the communication manners, but all from ZHANG San.

After all the communication records have been found, a correlation among communication records A1, A2 and A3 is established, so that communication records A2 and A3 will be outputted along with communication record A1.

By the method, communication records of different communication manners of one person have a correlation therebetween, and thus the communication records can be outputted simultaneously, which brings convenience to the user.

Same examples are given below.

It is assumed that user B sends to user A a short message to inquiry the price of a series of products. User A sends a short message back to user B, informing user B that he had tell user B the things in a previous email. By using the method according to the embodiment of the present disclosure, a correlation between the communication records of emails transmitted from User A and the communication records of short messages transmitted from User A can be established based on the mobile phone number of User A and the email address recorded in the item of User A, and the communication records of emails are outputted to User B when the communication records of the short messages are outputted. User B thus can know that User A had sent an email previously. The mailing date, subject of the email can be obtained from the communication record of the email. User B knows that User A had told him of the things in the email previously. Therefore, the email can be quickly located based on information of the communication record of the email, which is easy to the user.

If User A calls User B but User B does not answer the call, User A sends a short message to User B to tell the things. At the time, in User B' electronic device, there are two communication records, i.e., a communication record of the missed call and a communication record of the unread short message. By using the method according to the embodiment of the present disclosure, a correlation is established between the two records, and the two records can be outputted simultaneously. When User B views the communication record of the missed call, he/she will be aware that there is an unread short message, and understand that User A sent a short message after the call. User B can view the short message without delay, which brings convenience to the users.

It is certain that a user may make a call when he/she had sent an email and got no reply. If the call is missed, a correlation is established between the communication record of the email sent by the user previously and the communication record of the following call according to the method of the embodiment of the present disclosure. The called user may understand that the user had sent an email before the call, and the two actions may be related to one thing. The called user thus can locate the email quickly based on the communication record of the email, and view it. The method brings convenience to the users.

From the foregoing description, it can be seen that the time when the correlated second communication record was recorded may be earlier or later than the time when the first communication record was recorded. It is not limited in the embodiment of the present disclosure. The focus of the embodiment of the present disclosure is on the establishment of correlation between communication records.

Certainly, the first communication record and the second communication record can be outputted simultaneously after the correlation is established therebetween.

Figure 8:
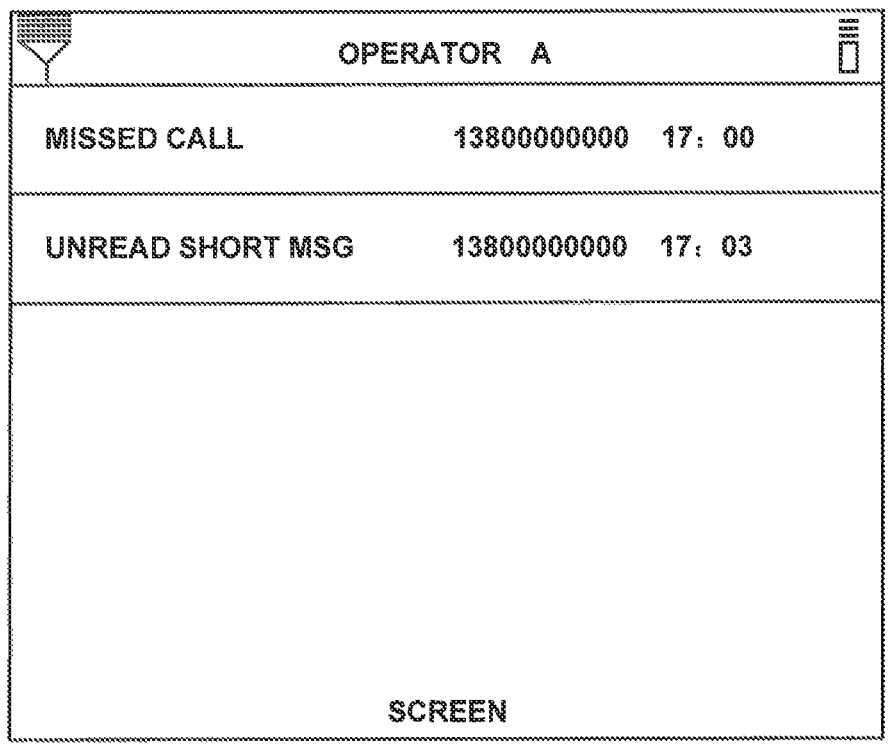
FIG. 8 is a schematic diagram showing communication records outputted on a display screen after a method according to an embodiment of the present disclosure is applied.

Take displaying as an example of outputting. FIG. 8 is a diagram showing an example of simultaneous outputting of communication records in case that a user having a mobile phone number of 13800000000 makes a call but the called party does not answer the call, and the user then transmits a short message to tell the things.

The called user sees a missed call at 17:00 from a user with the mobile phone number 13800000000 on its screen, and a short message sent after the call. The called user may turn to the short message interface to read the short message right now. The called user may only know that there is a missed call but does not know that the user sent a short message thereafter without the method of the embodiment of the present disclosure, which is inconvenient to the users.

Certainly, the embodiment of the present disclosure is not limited to whether the communication records are labeled as unread or not. In the above examples, the method according to the embodiment of the present disclosure is also applicable in the case that User B has read the email User A sent previously. Also, the method according to the embodiment of the present disclosure can be applied in the case that the first and second communication records both are labeled as unread, as shown in FIG. 8.

The communication records of various communication manners may have the same content, including the user, time, processing state, etc. However, with respect to different communication manners, some communication records correspond to communication data content stored in the electronic device. For example, a short message communication record corresponds to content of the short message, and an email communication record corresponds to content of the email. Some communication records have no corresponded communication data content stored in the electronic device. For example, for a voice communication record, even a successful voice communication, there is no voice data generated during the communication stored in the electronic device. Accordingly, in the embodiment of the present disclosure, if the first and second communication records each have corresponding communication content date, the operation of outputting the first and second communication records simultaneously includes outputting the communication content data of the first and second communication records.

Figure 9:
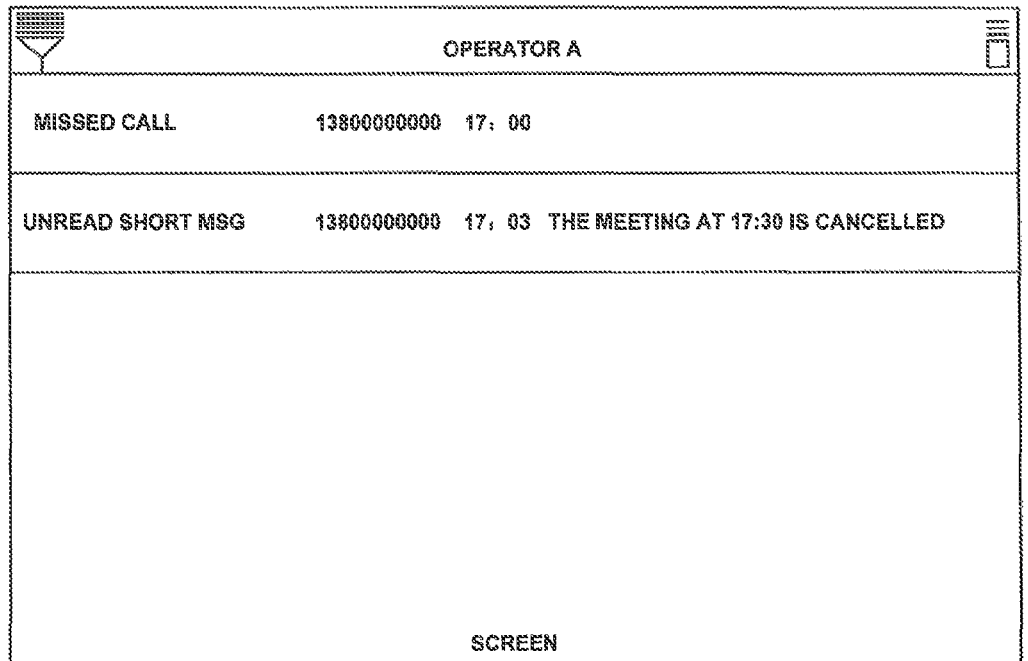
FIG. 9 is a schematic diagram showing communication records and communication data content outputted on a display screen after a method according to an embodiment of the present disclosure is applied.

Take displaying as an example of outputting. FIG. 9 is a diagram showing an example of simultaneous outputting of communication records in case that a user having a mobile phone number of 13800000000 makes a call but the called party does not answer the call, and the user then transmits a short message to tell the things. The data content of the short message reads as: the meeting at 17:30 is cancelled.

The above description relates to the short message cases. It is applicable to the instant communication manner, email communication manner, etc. The difference only consists in the data content. That is, the data content may be text, images or videos. The detailed description of various cases is omitted herein.

In the embodiment of the present disclosure, the sequence of the recording times of the first communication record and the second communication record is not limited. For example, a communication record of an unread short message and a communication record of an email sent before the short message can be correlated and outputted. A communication record of a missed call and a communication record of a short message sent after the call can be correlated and outputted. A communication record of an unread short message, a communication record of an email sent before the short message, and a communication record of a missed call made after the short message can be correlated and outputted.

In the embodiment of the present disclosure, the time when the second communication record is recorded may be later than the time when the first communication record is recorded. Putting another way, only the second communication record that is generated after the first communication record is correlated with the first communication record.

In the embodiment of the present disclosure, when a new communication record occurs, the communication record may be incorporated into the correlation that has been established among the present communication records of the same person (i.e., the user identifications refer to the same person), so that all communication records of one person are correlated, which is convenient to the user. Accordingly, the information notification method according to the embodiment of the present disclosure further includes steps of:

determining fourth user identification corresponding to a new, third communication record when the third communication record appears, and establishing a correlation between the first communication record and the third communication record when the fourth user identification is the same or associated with the first user identification, so that the first and second communication records are outputted simultaneously.

Figure 10:
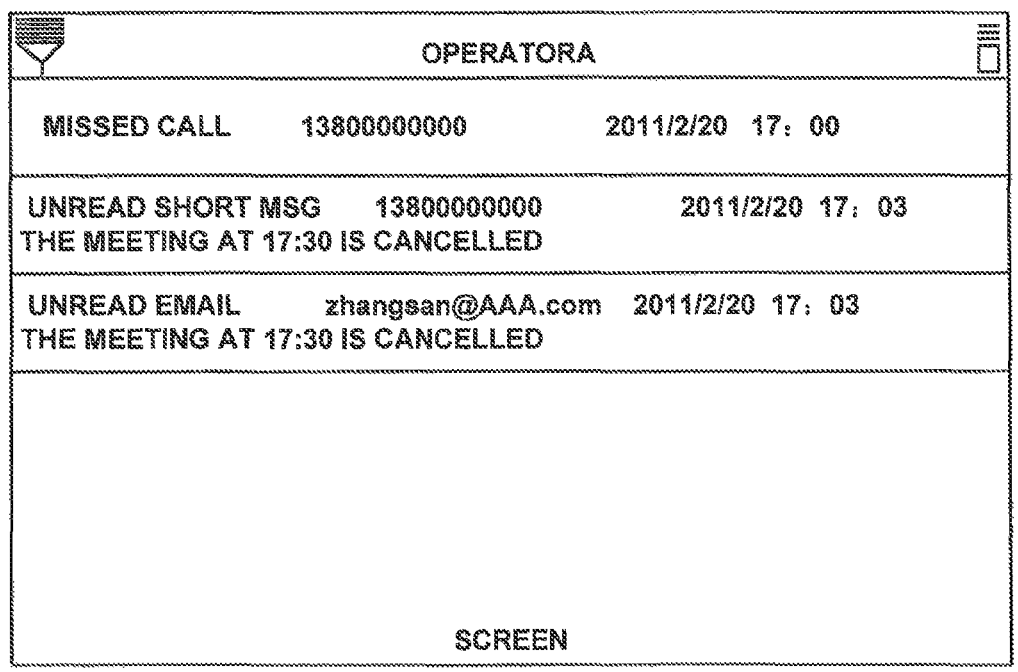
FIG. 10 is a schematic diagram showing communication records and communication data content outputted at a display screen that are updated after a communication record is newly generated when a method according to an embodiment of the present disclosure is applied.

An example shown in FIG. 9 is illustrated below, It is assumed that User ZHANG San (having a mobile phone number of 13800000000) sends an email at 17:03, with the content being that the meeting at 17:30 is cancelled, and the sending address being zhangsan@AAA.com, At that time, with respect to User ZHANG San, there had been a mobile phone number of 13800000000 and an email address of zhangsaneAAA.com in the contact list. At the time, fourth user identification (zhangsan@AAA.com) corresponding to the third communication record is determined, Because zhangsan@AAA.com and 13800000000 is under the same item, they are correlated with each other, A correlation is established between the communication record of the missed call and the communication record of the unread email, and the communication records are finally outputted on the screen, as shown in FIG. 10.

Certainly, in the embodiment of the present disclosure, the correlation may be performed each time a communication record is newly generated, The next is the determination and correlation establishment operations. Thus, the information notification method according to the embodiment of the present disclosure further includes:

determining whether there is a new communication record generated, setting a newly generated communication record as the first communication record if the new communication record is generated. The following is the determination and correlation establishment operations.

If a communication record of a missed call is generated, the mobile phone number is extracted, and a correlation is established between the communication record of the missed call and other communications generated before (whose user identifications are under the same item in the contact list with the calling number of the missed call).

In the above description, it is determined whether two user identifications are correlated by determining whether they are stored in one item in the contact list. It should be understood that the method for determining whether two user identifications are correlated is not limited thereto. For example, user names are stored in the contact list, while the contact of the email client also contains user names. When the user identifications of the two communication manners correspond to the same user name, it can be determined that they are correlated.

It is apparent that the correlation determination method may be different with respect to different storage manners of various user identifications. The technique for determining whether two user identifications correspond to the same person is obvious to one skilled in the art, and thus the other determination methods are not described herein in details.

It is certain that communication records would be generated continually. The amount of the communication records of some users may be very large. The complicated correlation is a challenge to the processing of the processor, and may be unnecessary to the users. In the embodiment of the present disclosure, the time interval between the time when the second communication record is recorded and the time when the first communication record is recorded is less than a predetermined time length.

Only the time interval between the recording times of communication records is defined. The precedence relationship of communication records is not limited, In the embodiment of the present disclosure, the first communication record may be a communication record of a missed call, the second communication record may be a notification sent by the caller of the missed call or an associated user of the caller after the call by a manner rather than making a call.

The flow of transmission of the notification is as follows. At the first, the first electronic device transmits a request to talk with a second electronic device (another electronic device mentioned in the embodiment of the disclosure) via a first application module 21, the second electronic device having second user identification.

The first electronic device determines whether it receives voice data collected from the second electronic device during the communication process when the communication process ends, and obtains a determination result.

The first electronic device automatically switches to a second application module 22 for transmitting a notification if the determination result indicates that no voice data has been received during the communication process.

In the process, according to the method, the calling electronic device automatically switches to a second application module 22 for transmitting a notification when the called party does not answer the call, so that the user can easily and conveniently transmit information to the called party. The method reduces the time for the user to search for the second application module 22, and brings convenience to the user.

The first application module 21 and the second application module 22 may be different application programs. For example, the first application module 21 may be a voice calling application module, while the second application module 22 may be a short messaging application, MSN client, email client, multimedia message transmitting module, etc. The first application module 21 and the second application module 22 may also be integrated into a software module. For instance, many communication software modules are capable of not only voice transmission, but also text transmission. In such case, switching to the second application module 22 is substantially turn-on of one functional module of the application module.

The user may transmit the notification after it switches to the second application module 22. However, for any communication manner, the transmission may be performed correctly only if the receiving party information is known. It is obvious that the information may be inputted by the user. When taking the contact list of the electronic device into account, all the communication manners of a user are recorded in one item. For example, one item of the contact list includes not only the mobile phone number, but also email address, QQ number, MSN number, etc. In order to further save time for the user and facilitate the operation, the first electronic device automatically sets user identification of a receiving party of the notification in the second application module 22 after the first electronic device automatically switches to the second application module 22 for transmitting the notification.

For different communication manners, user identifications of the receiving party are different. Accordingly, the appropriate user identification is selected based on the communication manner of the second application module 22,. Automatically setting user identification of a receiving party of the notification in the second application module 22 after the first electronic device automatically switches to the second application module for transmitting the notification further includes:

determining the communication manner of the second application module 22;

selecting the second user identification or third user identification associated with the second user identification based on the communication manner; and setting the selected user identification as the user identification of the receiving party of the notification in the second application module 22.

An example is given below,

It is assumed that information about user A in the contact list is:

Name: AAA

Mobile phone number: 13333333333

QQ number: 22222222

MSN number: AAA@hotmail.com.

Herein, take the case where the second application module 22 is a short message transmission module as an example. When it is determined that the second application module 22 is a short message transmission module, it is determined that user identification corresponding to the communication manner is a mobile phone number. In such case, the mobile phone number 13333333333 is used as the user identification of the receiving party. If the second application module 22 is a QQ client, the QQ number 22222222 is selected as the user identification of the receiving party.

The transmission is performed to transmit a notification to the counterpart once the user identification of the receiving party has been determined, so that the called user knows the things that the calling user wants to tell in the missed call.

In the above description, it is described that the number of the second communication records may be reduced by taking the occurrence sequence, time interval between the recording times, whether the record is labeled as unread or not, and other factors into account. In the embodiment of the present disclosure, other factors may be used to determine the number of the second communication records. The detailed description is given below.

The first communication record and the second communication record have the same tag, which tag is set and transmitted by the originator of the communication records.

In the processing, a tag corresponding to the first communication record is determined when determining the first user identification in the first communication record.

The second communication record corresponding to the third user identification corresponds to a second communication manner that is different from the first is communication manner, and has the same tag as the first communication record.

Some examples are given below.

It is assumed that User A transmits a short message to User B via a short message communication manner, and sets a tag X for the short message that will be transmitted to the counterpart. After that, User A gets no reply to the message from User B. User A transmits an email to User B via an Email communication manner, to tell the same thing, and sets a tag X for the email that will be transmitted to the counterpart. When a period has lapsed after that, User A transmits an instant message to User B via an instant communication manner, which message indicates a thing that is different from those told in the previous short message and email. User A may set a tag Y which will be transmitted to the counterpart, or may not set such tag.

At the time, in User B's electronic device, there are three communication records which are transmitted from User A. According to the method preceding the embodiment of the present disclosure, a correlation will be established among the three communication records so that they can be outputted simultaneously. However, the communication record of the instant message is different from the communication record of the short message and the communication record of the email except for the originator. By using the tag, User B's electronic device will establish a correlation only between the communication record of the short message and the communication record of the email, so that the communication record of the short message and the communication record of the email, and their content, can be outputted simultaneously. In such a way, the correlation of the communication records that are correlated with each other is enhanced (in the example, the short message and the email are transmitted for the same thing).

Certainly, there are various methods for transmitting tags. For example, a tag may be transmitted by adding a tag field in the data structure for message transmission, or adding the tag at a specific location in the transmitted data content. The foregoing is just some of the examples.

Figure 11:
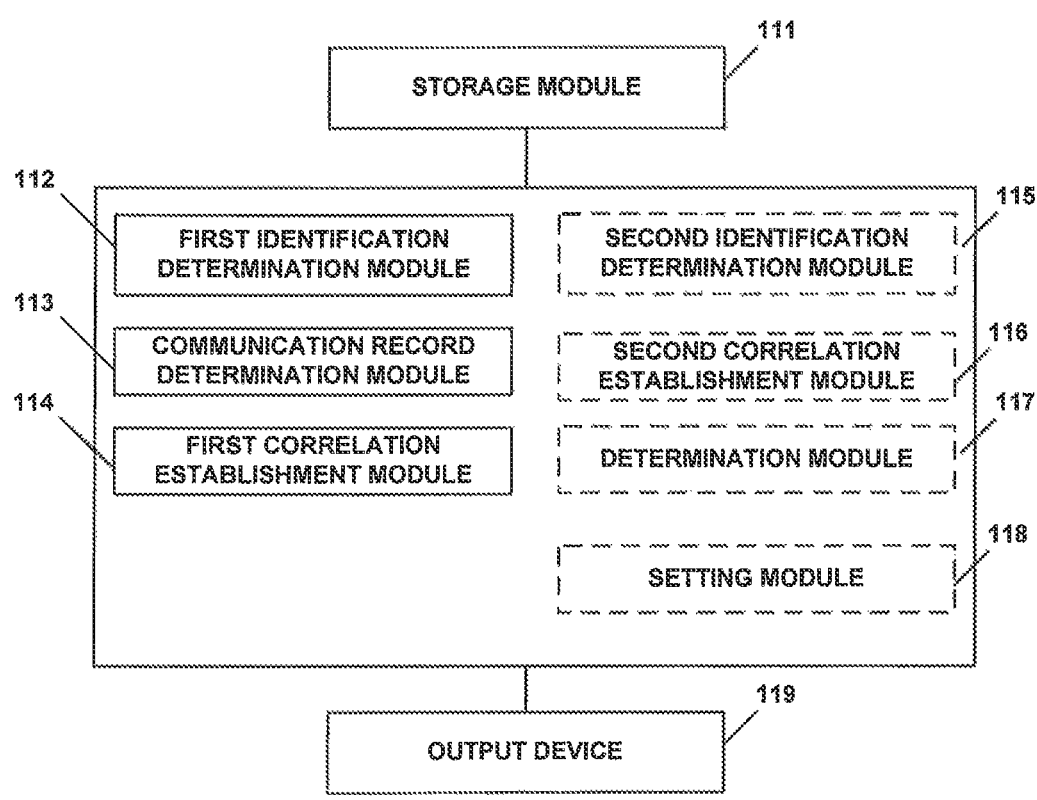
FIG. 11 is a schematic diagram showing an electronic device according to another embodiment of the present disclosure.

FIG. 11 shows an information notification apparatus for an electronic device which supports at least two communication manners according to an embodiment of the present disclosure. The information notification apparatus includes:

a first identification determination module 112 configured to determine first user identification recorded in a first communication record, the first communication record corresponding to a first communication manner;

a communication record determination module 113 configured to determine a second communication record corresponding to third user identification, the second communication record corresponding to a second communication manner that is different from the first communication manner, the third user identification being the same or associated with the first user identification; and a first correlation establishment module 114 configured to establish a correlation between the first communication record and the second communication record so that the first and second communication records are outputted simultaneously.

The information notification apparatus further includes:
an output module 119 configured to output the first and second communication records simultaneously.

In the information notification apparatus, the first and second communication records are communication records labeled as unread.

In the information notification apparatus, when the first and second communication records each have corresponding communication content data, the output module is configured to output the communication content data of the first and second communication records simultaneously.

In the information notification apparatus, the time when the second communication so record is recorded is later than that the first communication record is recorded.

The information notification apparatus further includes:
a second identification determination module 115 configured to determine fourth user identification corresponding to a new, third communication record when the third communication record appears, and
a second correlation establishment module 116 configured to establish a correlation between the first communication record and the third communication record when the fourth user identification is the same or associated with the first user identification, so that the first and second communication records are outputted simultaneously.

The information notification apparatus further includes:
a determination module 117 configured to determine whether there is generated a new communication record,
a setting module 118 configured to set a newly generated communication record as the first communication record if the new communication record is generated.

In the information notification apparatus, the time interval between the time when the second communication record is recorded and the time when the first communication record is recorded is less than a predetermined time length.

In the information notification apparatus, the first communication record is a missed call record, and the second communication record is the notification sent by the caller of the missed call or an associated user of the caller after the call by a manner rather than making a call, An electronic device according to an embodiment of the present disclosure includes:
a communication module 11 configured to support at least two communication manners,
a storage module 12 configured to store communication records and user identification,
an output unit 16, and
a processor 15 configured to determine first user identification recorded in a first communication record of the communication records, determine a second communication record of the communication records corresponding to third user identification, and establish a correlation between the first communication record and the second communication record, so that the output unit outputs the first and second communication records simultaneously, the first communication record corresponding to a first communication manner, the third user identification being the same or associated with the first user identification, the second communication record corresponding to a second communication manner that is different from the first communication manner.

In the electronic device, the processor 15 further includes:
a first identification determination module 112 configured to determine first user identification recorded in a first communication record, the first communication record corresponding to a first communication manner;
a communication record determination module 113 configured to determine a second communication record corresponding to third user identification, the second communication record corresponding to a second communication manner that is different from the first communication manner, the third user identification being the same or associated with the first user identification; and
a first correlation establishment module 114 configured to establish a correlation between the first communication record and the second communication record so that the first and second communication records are outputted simultaneously.

According to the embodiment of the present disclosure, the communication module may be a module for wired communication, such as a wired network card, or a module for wireless communication, such as a wireless network card, or an existing radio frequency transmitter including antennas in a wireless communication terminal. A device capable of communication necessarily has at least one communication module. The communication module according to the embodiment of the present disclosure is similar to the present communication module, and is not described in details herein.

It should be understood that the term "different communication manners" referred to in the embodiment of the present disclosure does not mean the wired-network based communication and wireless-network based communication, It refers to communications performed by different applications. Even if both communications utilize a fixed network or a wireless network, the communication manner of a communication performed by a short-message based application and the communication manner of a communication performed by an Email based application belong to different communication manners. Even the communication manners of communications performed by different modules of one application are different communication manners. For example, instant messaging software is capable of not only voice communication, but also text communication, In such case, the communications manners of respective communications are considered as being different.

The storage module stores the communication records and the correlation between user identifications. The storage module may be embodied as internal memory cards, hard disks, or external, such as an external memory device (e.g., USB disk, flash disk, etc.) that connects to the mainboard of the electronic device via a USB interface.

The outputting may be displaying, and thus the output device 119 may be embodied as an LCD screen of the electronic device. With regard to different outputting manners, the output device may be a voice output device of the electronic device, such as an audio adapter and a speaker. In some cases, the output may be implemented as vibrations of a vibration motor, The foregoing is just some of the examples.

In the electronic device, the processor 15 further includes:
a first identification determination module 112 configured to determine first user identification recorded in a first communication record, the first communication record corresponding to a first communication manner;
a communication record determination module 113 configured to determine a second communication record corresponding to third user identification, the second communication record corresponding to a second communication manner that is different from the first communication manner, the third user identification being the same or associated with the first user identification; and a first correlation establishment module 114 configured to establish a correlation between the first communication record and the second communication record so that the first and second communication records are outputted simultaneously.

Many of the functional components are designated as modules in the specification to particularly emphasize the independency of their implementations.

In the embodiments of the present disclosure, the modules may be implemented in software to be executable by various kinds of processors. For example, an identifiable, executable code module may include one or more physical or logic blocks of computer instructions. For instance, it may be structured as an object, a process or a function, Nevertheless, the identifiable executable code module is not required to be physically co-located, It may include various instructions distributed among different locations, which, when integrated together logically, form the module and may accomplish the desired object of the module.

Practically, the executable code module may be a single piece of instruction, or a plurality of pieces of instructions, and may be distributed among a plurality of different code segments, among different programs, or across a plurality of storage devices. Similarly, the operation data may be identified within the module, and may be implemented in any appropriate way and organized in a data structure of any appropriate type. The operation data may be collected as a set of data, or distributed among different locations (or among different storage devices), and may at least in part be implemented as electronic signals on systems or networks.

When taking the current hardware technique into account, even although the module may be implemented in software, one skilled in the art may create a corresponding circuitry to implement the intended function at the price of the cost. The circuitry includes the common very large scale integration (VLSI) circuit or gate array, the existing semiconductor (such as logic chip, transistor) or any other discrete component. The module may be implemented by a programmable hardware device, such as a field programmable gate array, a programmable array logic, a programmable logic device, or others.

The foregoing description is only directed to specific embodiments of the present disclosure. Any change or modification that is obvious to one of ordinary skill in the art in light of the present disclosure will fall within the scope thereof without departing from the principle of the present disclosure.

What is claimed is:

1. An information notification method for an electronic device which supports at least two communication manners, wherein the method comprises the steps of:
   determining, by the electronic device, first user identification recorded in a first communication record with regard to a first incoming communication, the first communication record corresponding to a first communication manner;
   determining, by the electronic device, a second communication record corresponding to third user identification with regard to a second incoming communication, the second communication record corresponding to a second communication manner that is different from the first communication manner, the third user identification being the same or associated with the first user identification; and
   establishing, by the electronic device, a correlation between the first communication record and the second communication record so that the first and second communication records are outputted on a same display of the electronic device simultaneously,
   wherein when the first and second communication records have corresponding communication content data, outputting the first and second communication records simultaneously further comprises outputting the communication content data of the first and second communication records simultaneously on the display.

2. The information notification method according to claim 1, wherein the first and second communication records are communication recorded labeled as unread.

3. The information notification method according to claim 1, further comprising:
   determining fourth user identification corresponding to a new, third communication record when the third communication record appears, and
   establishing a correlation between the first communication record and the third communication record when the fourth user identification is the same or associated with the first user identification, so that the first and third communication records are outputted simultaneously.

4. The information notification method according to claim 1, wherein the time interval between the time when the second communication record is recorded and the time when the first communication record is recorded is less than a predetermined time length.

5. The information notification method according to claim 1, wherein the first communication record is a communication record of a missed call, and the second communication record is the notification sent by the caller of the missed call or an associated user of the caller after the call by a manner rather than making a call.

6. The information notification method according to claim 1, wherein the first communication record and the second communication record have the same tag, which tag is set and transmitted by the originator of the communication records.

7. An electronic device which supports at least two communication manners, the electronic device comprising:
   an output device; and
   a processor configured to:
   determine first user identification recorded in a first communication record with regard to a first incoming communication, the first communication record corresponding to a first communication manner;
   determine a second communication record corresponding to third user identification with regard to a second incoming communication, the second communication record corresponding to a second communication manner that is different from the first communication manner, the third user identification being the same or associated with the first user identification; and
   establish a correlation between the first communication record and the second communication record so that the first and second communication records are outputted on the output device simultaneously,
   wherein when the first and second communication records each have corresponding communication content data, the output device is configured to output the communication content data of the first and second communication records simultaneously.

8. The electronic device according to claim 7, wherein the first and second communication records are communication records labeled as unread.

9. The electronic device according to claim 7, wherein the processor is further configured to:
   determine fourth user identification corresponding to a new, third communication record when the third communication record appears, and
   establish a correlation between the first communication record and the third communication record when the fourth user identification is the same or associated with the first user identification, so that the first and third communication records are outputted simultaneously.

10. The electronic device according to claim 7, wherein the time interval between the time when the second communication record is recorded and the time when the first communication record is recorded is less than a predetermined time length.

11. The electronic device according to claim 7, wherein the first communication record is a missed call record, and the second communication record is the notification sent by the caller of the missed call or an associated user of the caller after the call by a manner rather than making a call.

12. The electronic device according to claim 7, wherein the first communication record and the second communication record have the same tag, which tag is set and transmitted by the originator of the communication records.

* * * * *